(12) United States Patent
Ward et al.

(10) Patent No.: US 6,726,420 B2
(45) Date of Patent: Apr. 27, 2004

(54) SCREW THREAD WITH CLEARANCE

(75) Inventors: Michael E. Ward, Geneva, IL (US); John H. Siegenthaler, Darlington, WI (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/880,562

(22) Filed: Jun. 13, 2001

(65) Prior Publication Data

US 2002/0025240 A1 Feb. 28, 2002

Related U.S. Application Data

(60) Provisional application No. 60/227,483, filed on Aug. 24, 2000.

(51) Int. Cl.⁷ ................................................ F16B 37/16
(52) U.S. Cl. ........................................ 411/436; 411/411
(58) Field of Search ................................ 411/436, 437, 411/308, 411, 423, 418, 366.1

(56) References Cited

U.S. PATENT DOCUMENTS

| | | | |
|---|---|---|---|
| 561,913 A | | 6/1896 | Paquette |
| 1,642,285 A | * | 9/1927 | Woodward |
| 1,828,856 A | * | 10/1931 | Bridges |
| 2,723,584 A | | 11/1955 | Parker |
| 2,896,495 A | | 7/1959 | Crawford |
| 3,323,402 A | * | 6/1967 | Gowen |
| 3,350,975 A | | 11/1967 | Bien |
| 3,501,995 A | | 3/1970 | Lanius, Jr. |
| 4,022,262 A | | 5/1977 | Gunn |
| 4,171,012 A | * | 10/1979 | Holmes |
| 4,237,948 A | | 12/1980 | Jones et al. |
| 4,293,262 A | | 10/1981 | Holmes |
| 4,299,520 A | | 11/1981 | Iwata |
| 4,334,815 A | | 6/1982 | Knohl |
| 4,540,321 A | | 9/1985 | Berecz |
| 4,826,377 A | | 5/1989 | Holmes |
| 4,889,460 A | | 12/1989 | Laidlaw et al. |
| 4,907,930 A | | 3/1990 | Peterson |
| 4,983,084 A | | 1/1991 | Gray |
| 5,000,638 A | | 3/1991 | Essom et al. |
| 5,183,359 A | | 2/1993 | Barth |
| 5,326,208 A | | 7/1994 | Werner |
| 5,704,750 A | * | 1/1998 | Bartos |
| 5,876,168 A | * | 3/1999 | Iwata |
| 6,406,238 B2 | * | 6/2002 | Takeuchi |

FOREIGN PATENT DOCUMENTS

JP    11051026    2/1999

OTHER PUBLICATIONS

ISO Standards Handbook, "Fasteners And Screw Threads", pp. 96–99 & 104–116.

* cited by examiner

*Primary Examiner*—Flemming Saether
(74) *Attorney, Agent, or Firm*—Mark W. Croll, Esq.; Paul F. Donovan, Esq.; Welsh & Katz, Ltd.

(57) ABSTRACT

An internally threaded body member having thread clearances includes a bore extending at least partially into the body member. The bore has a screw thread disposed therein. The screw thread has a pitch diameter increased not less than 26% of a tooth height of the thread.

25 Claims, 3 Drawing Sheets

SCREW THREAD WITH CLEARANCE

BACKGROUND OF THE INVENTION

The invention relates generally to screw threads, and more particularly to threads having clearance configurations.

Nuts configured for removing coating, for example paint, from threaded shafts upon installation thereabout are known generally. One known nut is the PAINTSCRAPER KEPS nut by ITW Shakeproof, Elgin, Ill., which includes a plurality of slots with a cutting edge extending generally radially from the threaded bore.

In some applications, particularly where the coating is heavy or thick, installation of the nut about the shaft is stalled by the increasing accumulation of coating between the threads. FIG. 4 illustrates a clearance area, which is normalized at 100% for comparative purposes, between internal and external screw threads manufactured in compliance with industry basic standard specifications.

An object of the present invention is to provide in some embodiments thereof novel thread forms that improve upon and overcome problems in the art.

Another object of the invention is to provide in some embodiments thereof novel thread forms having improved clearance configurations, for example to accommodate increased amounts of coating between mated internal and external threads.

A related object of the invention is to provide in some embodiments thereof novel thread forms having improved clearance configurations without unduly compromising loading capacity.

Another object of the invention is to provide in some embodiments thereof novel thread forms having pitch diameters outside industry standard basic pitch diameter tolerance.

Another object of the invention is to provide in some embodiments thereof novel internal thread forms, for example on nuts and other threaded bores, having relatively increased pitch diameters.

A further object of the invention is to provide in some embodiments thereof novel external thread forms, for example on bolts and other threaded shafts, having relatively reduced pitch diameters.

Still another object of the invention is to provide in some embodiments thereof novel thread forms having major or minor diameters outside industry standard basic major or minor diameter tolerance.

Another object of the invention is to provide in some embodiments thereof novel internal thread forms having relatively increased minor thread diameters.

A further object of the invention is to provide in some embodiments thereof novel external thread forms having relatively reduced major thread diameters.

Yet another object of the invention is to provide in some embodiments thereof novel internal and external thread forms having modified flank configurations, for example asymmetric flanks or some other flank configuration that provides increased clearance.

Still another object of the invention is to provide in some embodiments thereof novel internal thread forms having a relatively increased minor thread diameter in combination with an increased pitch diameter and/or in combination with a modified flank configuration.

It is another object of the invention to provide in some embodiments thereof novel external thread forms having a relatively reduced major thread diameter in combination with a reduced pitch diameter and/or in combination with a modified flank configuration.

A more particular object of the invention is to provide in some embodiments thereof novel internal thread forms comprising a bore extending at least partially into a body member, the bore having a screw thread disposed therein, the screw thread having a pitch diameter increased not less than 26% of a tooth height thereof.

Another more particular object of the invention is to provide in some embodiments thereof novel coating clearance nuts having a course thread size of 4 mm or more and a thread pitch of 0.7 or more, comprising a screw thread having a pitch diameter not less than 4.5% greater than an industry standard basic pitch diameter specified for the thread size.

A more particular object of the invention is to provide in some embodiments thereof novel internal thread forms comprising a threaded bore extending at least partially into the body member, the thread having a minor diameter approximately the same as the pitch diameter.

Yet another more particular object of the invention is to provide in some embodiments thereof novel internally threaded body members having a course thread size of 4 mm or more and a thread pitch of 0.7 or more, the thread having a minor diameter not less than 7.7% more than an industry standard basic minor diameter specified for the thread size.

Still another more particular object of the invention is to provide in some embodiments thereof novel internally threaded body members comprising a bore extending at least partially into the body member, the bore having a helical screw thread disposed therein, the screw thread has an asymmetric flank configuration.

Another more particular object of the invention is to provide in some embodiments thereof novel externally threaded body members comprising a shaft having a screw thread disposed thereabout, the crew thread having a tooth height, the screw thread having a pitch diameter decreased not less than 26% of a tooth height thereof.

Another more particular object of the invention is to provide in some embodiments thereof novel coating clearance bolts having a course thread size of 4 mm or more and a thread pitch of 0.7 or more, comprising a screw thread having a pitch diameter not less than 4.5% less than an industry standard basic pitch diameter specified for the thread size.

Another more particular object of the invention is to provide in some embodiments thereof novel externally threaded body members having a course thread size of 4 mm or more, comprising a screw thread having a major diameter not less than 7.7% less than an industry standard basic major diameter specified for the thread.

Still another more particular object of the invention is to provide in some embodiments thereof novel.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
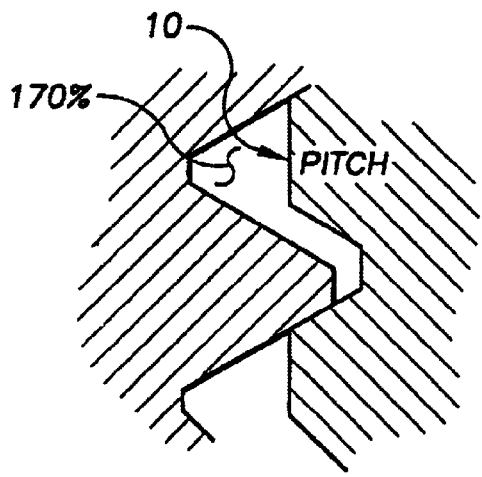
FIG. 1 is a partial sectional view of a thread form according to a first exemplary embodiment of the invention.
Figure 4:
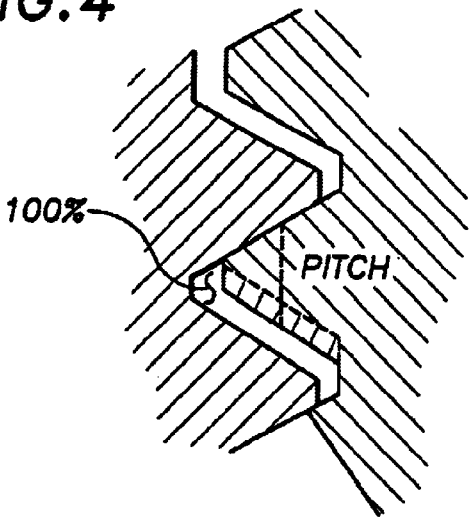
FIG. 4 is a partial sectional view of a thread form according to yet another exemplary embodiment of the invention.

FIG. 1 illustrates mated internal and external threads having an increased clearance therebetween that is 170% in relation to the clearance illustrated in FIG. 4, discussed above.

In one embodiment, the clearance in FIG. 1 is increased by increasing the minor diameter of the internal thread. According to this configuration, the tooth 10 in FIG. 1 is of an internal thread formed in a bore, for example in the coating clearing nut 20 having generally radially extending slots 22, illustrated in FIGS. 5–7.

Figure 5:
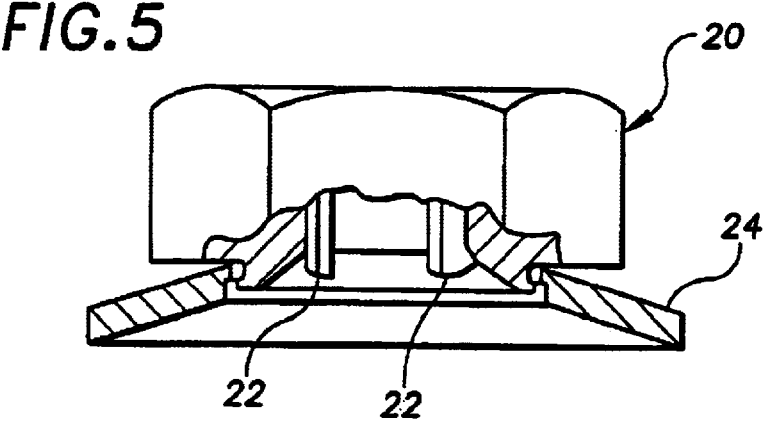
FIG. 5 is partial sectional view of a nut comprising one or more of the thread alternative forms of the present invention in combination.
Figure 6:
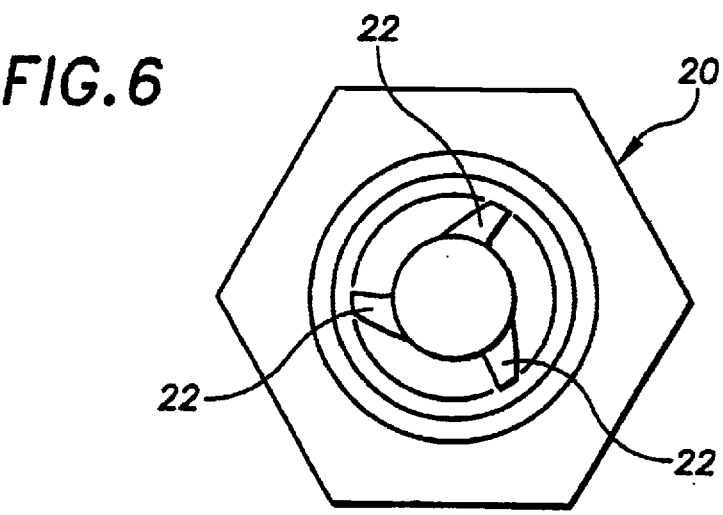
FIG. 6 is a partial top plan view of the nut of FIG. 5.
Figure 7:
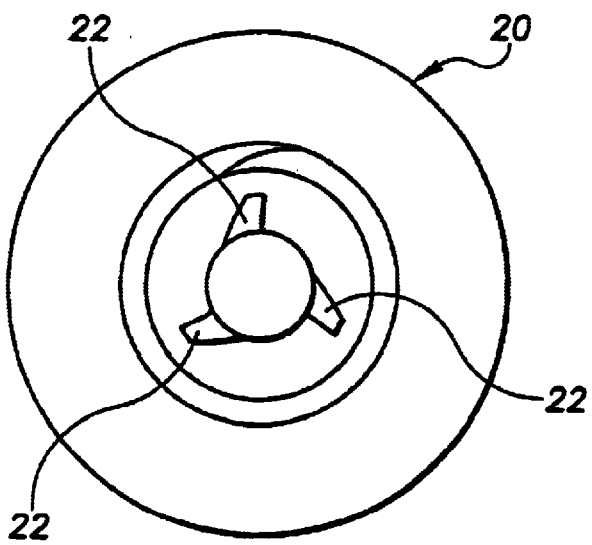
FIG. 7 is a bottom plan view of the nut of FIG. 5.

The exemplary nut 20 of FIGS. 5 and 7 includes a washer 24 assembled therewith. In other embodiments, the nut does not include the slots or washer. Still more generally, the screw thread may be formed in any bore extending partially or fully through any body member, for example a plate or some other article besides a nut.

In some internal thread embodiments, the minor diameter is increased outside the industry standard basic minor diameter tolerance specified for the particular thread size. The extent to which the minor diameter is increased is limited to some extent by the loading requirements, although in some embodiments the axial length of the threaded bore may be increased to compensate for the decreased load bearing capacity of the truncated thread.

In a more particular embodiment, the internally threaded body member, or one of the exemplary nuts, has a course thread size of 4 mm or more, and the thread has a minor diameter not less than 7.7% more than an industry standard basic minor diameter specified for the corresponding thread size.

According to this interpretation of FIG. 1, the minor diameter is approximately the same as the pitch diameter. The pitch diameter may be an industry standard, for example the ISO industry standard, basic pitch diameter specified for a particular thread size. In other embodiments, however, the pitch diameter may be outside industry standard basic pitch diameter tolerance.

For purposes of the present disclosure, the ISO standard basic pitch diameter $D_2$ of an internal thread is determined according to the following formula:

$$D_2 = D - [2(\tfrac{3}{8})H] = D - 0.649(5)P, \text{ where:}$$

D is the basic major diameter of the internal thread (nominal diameter),

H is the height of the fundamental triangle, and

Figure 8:
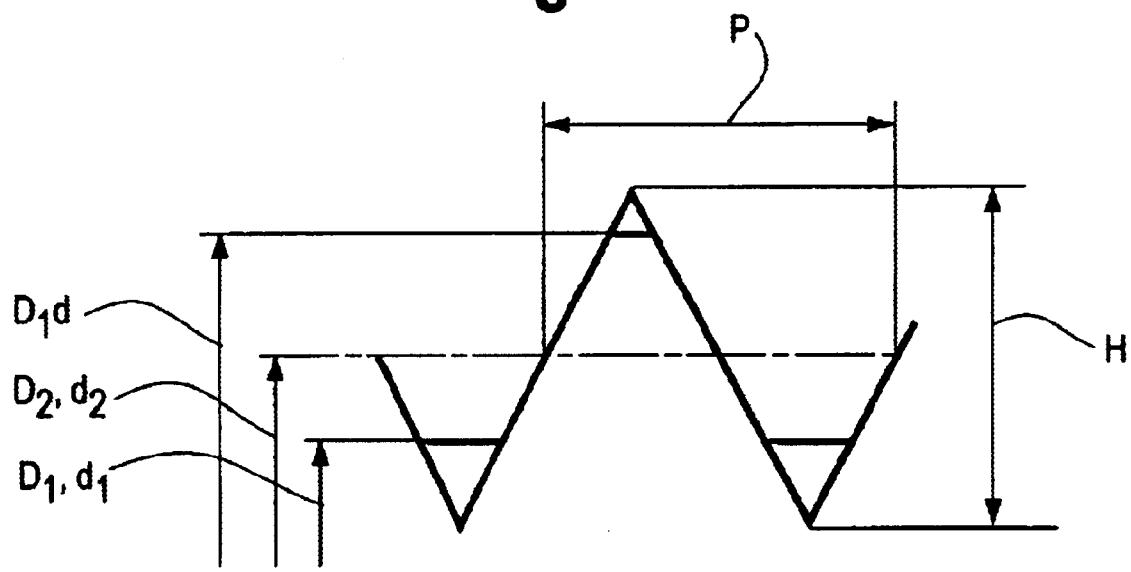
FIG. 8 illustrates an ISO standard basic screw thread major, minor and pitch diameters for internally and externally threaded members.

P is the pitch, all as illustrated in FIG. 8, and the ISO standard basic pitch diameter $d_2$ of an external thread is determined according to the following formula:

$$d_2 = d - [2(\tfrac{3}{8})H] = d - 0.649(5)P, \text{ where:}$$

d is the basic major diameter of the external thread (nominal diameter),

H is the height of the fundamental triangle, and

P is the pitch, all as illustrated in FIG. 8, and the ISO standard minor diameter $D_1$ of an internal thread is determined according to the following formula:

$$D_1 = D - [2(\tfrac{5}{8})H] = D - 1.082(5)P, \text{ where:}$$

D is the basic major diameter of the internal thread (nominal diameter),

H is the height of the fundamental triangle, and

P is the pitch, all as illustrated in FIG. 8, and the ISO standard minor diameter $d_2$ of an external thread is determined according to the following formula:

$$d_1 = d - [2(\tfrac{5}{8})H] = d - 1.082(5)P, \text{ where:}$$

d is the basic major diameter of the external thread (nominal diameter),

H is the height of the fundamental triangle, and

P is the pitch, all as illustrated in FIG. 8, for threaded members having the following nominal (major) diameters and pitches:

| Nom. (maj. dia.) | Pitch(es) |
|---|---|
| 1.0 | 0.25, 0.2 |
| 1.1 | 0.25, 0.2 |
| 1.2 | 0.25, 0.2 |
| 1.4 | 0.3, 0.2 |
| 1.6 | 0.35, 0.2 |
| 1.8 | 0.35, 0.2 |
| 2.0 | 0.4, 0.25 |
| 2.2 | 0.45, 0.25 |
| 2.5 | 0.45, 0.35 |
| 3.0 | 0.5, 0.35 |
| 3.5 | 0.6, 0.35 |
| 4.0 | 0.7, 0.5 |
| 4.5 | 0.75, 0.5 |
| 5.0 | 0.8, 0.5 |
| 5.5 | 0.5 |
| 6.0 | 1.0, 0.75 |
| 7.0 | 1.0, 0.75 |
| 8.0 | 1.25, 1.0, 0.75 |
| 9.0 | 1.25, 1.0, 0.75 |
| 10.0 | 1.5, 1.25, 1.0, 0.75 |
| 11.0 | 1.5, 1.0, 0.75 |
| 12.0 | 1.75, 1.5, 1.25, 1.0 |
| 14.0 | 2.0, 1.5, 1.25, 1.0 |
| 15.0 | 1.5, 1.0 |
| 16.0 | 2.0, 1.5, 1.0 |
| 17.0 | 1.5, 1.0 |
| 18.0 | 2.5, 2.0, 1.5, 1.0 |
| 20.0 | 2.5, 2.0, 1.5, 1.0 |
| 22.0 | 2.5, 2.0, 1.5, 1.0 |
| 24.0 | 3.0, 2.0, 1.5, 1.0 |
| 25.0 | 2.0, 1.5, 1.0 |
| 26.0 | 1.5 |
| 27.0 | 3.0, 2.0, 1.5, 1.0 |
| 28.0 | 2.0, 1.5, 1.0 |
| 30.0 | 3.5, 3.0, 2.0, 1.5, 1.0 |
| 32.0 | 2.0, 1.5 |

-continued

| Nom. (maj. dia.) | Pitch(es) |
|---|---|
| 33.0 | 3.5, 3.0, 2.0, 1.5 |
| 35.0 | 1.5 |
| 36.0 | 4.0, 3.0, 2.0, 1.5 |
| 38.0 | 1.5 |
| 39.0 | 4.0, 3.0, 2.0, 1.5 |
| 40.0 | 3.0, 2.0, 1.5 |

In an alternative embodiment, the clearance in FIG. 1 is increased by decreasing the major diameter of the external thread. According to this configuration, the tooth 10 in FIG. 1 is a tooth of an external thread formed on a shaft, for example a bolt.

In some external thread embodiments, the major diameter is outside the industry standard basic major diameter tolerance specified for the particular thread size. The extent to which the major diameter is decreased is limited to some extent by the loading requirements.

In a more particular embodiment, the externally threaded body member has a course thread size of 4 mm or more, and the thread has a major diameter not less than 7.7% less than an industry standard basic major diameter specified for the corresponding thread size.

According to this alternative interpretation of FIG. 1, the major diameter is approximately the same as the pitch diameter. The pitch diameter may be an industry standard, for example the ISO industry standard, basic pitch diameter specified for a particular thread size. In other embodiments, however, the pitch diameter may be outside industry standard basic pitch diameter tolerance.

Figure 2:
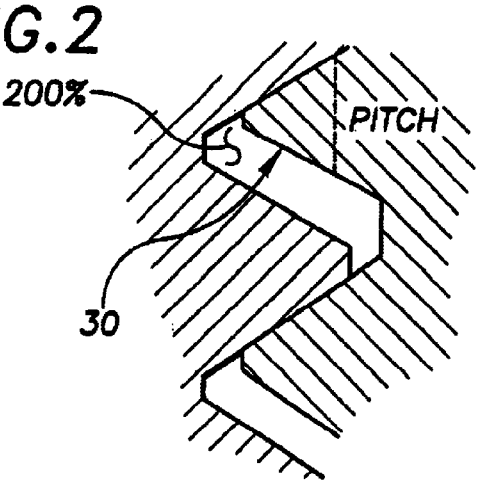
FIG. 2 is a partial sectional view of a thread form according to a second exemplary embodiment of the invention.

FIG. 2 illustrates mated internal and external threads having an increased clearance therebetween that is 200% in relation to the clearance illustrated in FIG. 4.

In one embodiment, the clearance in FIG. 2 is increased by increasing the pitch diameter of the internal thread. According to this configuration, the tooth 30 in FIG. 2 is of an internal thread formed in a bore, for example of the coating clearing nut 20 of FIGS. 5–7.

In an alternative embodiment, the clearance in FIG. 2 is increased by decreasing the pitch diameter of the external thread. According to this configuration, the tooth 30 in FIG. 2 is of an external thread formed on a shaft, for example a bolt shaft.

In some external thread embodiments, the pitch diameter is outside the industry standard basic pitch diameter tolerance specified for the particular thread size.

In an exemplary internal thread embodiment, the internally threaded body member has a course thread size of 4 mm or more, and the thread has a pitch diameter not less than 4.5% greater than an industry standard basic pitch diameter specified for the thread size.

In an exemplary external thread embodiment, the externally threaded body member, or shaft, has a course thread size of 4 mm or more, and the thread has a pitch diameter not less than 4.5% less than an industry standard basic pitch diameter specified for the thread size.

In another alternative pitch diameter embodiment, applicable to both internal and external threads, the thread has a pitch diameter increased not less than 26% of a tooth height thereof.

Figure 3:
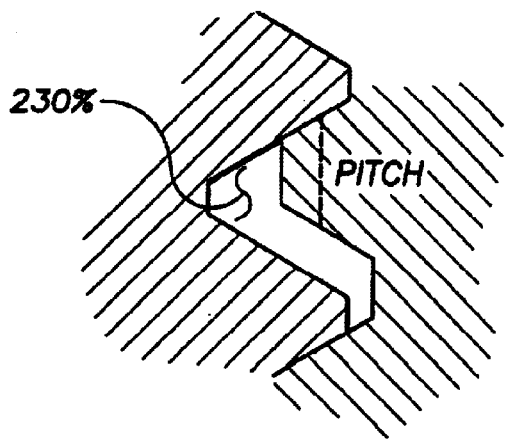
FIG. 3 is a partial sectional view of a thread form according to another exemplary embodiment of the invention.

FIG. 3 illustrates mated internal and external threads having an increased clearance therebetween by modifying both pitch diameter and the major or minor thread diameter.

In FIG. 3, the exemplary clearance is 230% in relation to the clearance illustrated in FIG. 4. The exemplary clearance percentage may be obtained in an internal thread having a pitch diameter increased not less than 18% of tooth height in combination with a minor diameter increased not less than 41% of the tooth height. The exemplary clearance percentage may also be obtained in an external thread having a pitch diameter decreased not less than 18% of tooth height in combination with a major diameter decreased not less than 41% of tooth height.

Several exemplary internal thread nut embodiments having both increased pitch and minor diameters are as follows: a 4 mm course thread size having 0.70 mm thread pitch, the pitch diameter is not less than 3.71 mm, the minor thread diameter is not less than 3.49 mm; a 5 mm course thread size having 0.8 mm thread pitch, the pitch diameter is not less than 4.69 mm, the minor thread diameter is not less than 4.46 mm; a 6 mm course thread size having 1.00 mm thread pitch, the pitch diameter is not less than 5.60 mm, the minor thread diameter is not less than 5.30 mm; an 8 mm course thread size having 1.25 mm thread pitch, the pitch diameter is not less than 7.52 mm, the minor thread diameter is not less than 7.16 mm; a 10 mm course thread size having 1.5 mm thread pitch, the pitch diameter is not less than 9.44 mm, the minor thread diameter is not less than 9.03 mm; a 12 mm course thread size having 1.75 mm thread pitch, the pitch diameter is not less than 11.36 mm, the minor thread diameter is not less than 10.89 mm; a 14 mm course thread size having 2.0 mm thread pitch, the pitch diameter is not less than 13.28 mm, the minor thread diameter is not less than 12.75 mm; and a 16 mm course thread size having 2.0 mm thread pitch, the pitch diameter is not less than 15.37 mm, the minor thread diameter is not less than 14.91 mm.

Several exemplary external threaded shaft embodiments having both decreased pitch and major diameters are as follows: a 4 mm course thread size having 0.70 mm thread pitch, the pitch diameter is not less than 3.71 mm, the minor thread diameter is not less than 3.49 mm; a 5 mm course thread size having 0.8 mm thread pitch, the pitch diameter is not less than 4.69 mm, the minor thread diameter is not less than 4.46 mm; a 6 mm course thread size having 1.00 mm thread pitch, the pitch diameter is not less than 5.60 mm, the minor thread diameter is not less than 5.30 mm; an 8 mm course thread size having 1.25 mm thread pitch, the pitch diameter is not less than 7.52 mm, the minor thread diameter is not less than 7.16 mm; a 10 mm course thread size having 1.5 mm thread pitch, the pitch diameter is not less than 9.44 mm, the minor thread diameter is not less than 9.03 mm; a 12 mm course thread size having 1.75 mm thread pitch, the pitch diameter is not less than 11.36 mm, the minor thread diameter is not less than 10.89 mm; a 14 mm course thread size having 2.0 mm thread pitch, the pitch diameter is not less than 13.28 mm, the minor thread diameter is not less than 12.75 mm; and a 16 mm course thread size having 2.0 mm thread pitch, the pitch diameter is not less than 15.37 mm, the minor thread diameter is not less than 14.91 mm.

FIG. 4 illustrates in phantom lines the thread having an asymmetric flank configuration to further increase thread clearance. More particularly, the non-load bearing flank of the screw thread is reduced in size relative to an opposite load bearing flank thereof, for example by removing a portion thereof corresponding to that delineated by the phantom lines.

The portions of the non-load bearing flank that are removed depends to some extent on the load bearing requirements and on where the coating is accumulated.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. An internally threaded, coating clearance body member for use with an associated ISO standard mating externally threaded element, comprising:
   a bore extending at least partially into the body member, the bore having a screw thread disposed therein,
   the screw thread having a pitch diameter that is at least 126 percent of a tooth height relative to the screw thread, wherein the screw thread has a clearance of at least 170 percent when threadedly engaged with the associated ISO standard mating externally threaded element, compared to an internally threaded member having an internal thread pitch diameter ($D_2$) defined by $D_2=D-0.649(5)P$, where D is a nominal diameter of the internal thread, and P is the pitch of the thread.

2. The member of claim 1 is a nut having a plurality of slots extending generally radially from the threaded bore, each slot having a cutting edge.

3. A coating clearance nut having a course thread size of 4 mm or more and a thread pitch of 0.7 or more for use with an associated ISO standard mating externally threaded element, comprising:
   the screw thread disposed in a bore of the nut,
   the screw thread having a pitch diameter that is at least 104.5 percent of $D-0.649(5)P$, where D is a nominal diameter of the internal thread, and P is the pitch of the thread, wherein the screw thread has a clearance of at least 170 percent when threadedly engaged with the associated ISO standard mating externally threaded element, compared to a nut having an internal thread pitch diameter ($D_2$) defined by $D_2=D-0.649(5)P$, where D is a nominal diameter of the internal thread, and P is the pitch of the thread.

4. The nut of claim 3 has a 4 mm course thread size having 0.70 mm thread pitch, the pitch diameter is not less than 3.71 mm, the minor thread diameter is not less than 3.49 mm.

5. The nut of claim 3 has a 5 mm course thread size having 0.8 mm thread pitch, the pitch diameter is not less than 4.69 mm, the minor thread diameter is not less than 4.46 mm.

6. The nut of claim 3 has a 6 mm course thread size having 1.00 mm thread pitch, the pitch diameter is not less than 5.60 mm, the minor thread diameter is not less than 5.30 mm.

7. The nut of claim 3 has an 8 mm course thread size having 1.25 mm thread pitch, the pitch diameter is not less than 7.52 mm, the minor thread diameter is not less than 7.16 mm.

8. The nut of claim 3 has a 10 mm course thread size having 1.5 mm thread pitch, the pitch diameter is not less than 9.44 mm, the minor thread diameter is not less than 9.03 mm.

9. The nut of claim 3 has a 12 mm course thread size having 1.75 mm thread pitch, the pitch diameter is not less than 11.36 mm, the minor thread diameter is not less than 10.89 mm.

10. The nut of claim 3 has a 14 mm course thread size having 2.0 mm thread pitch, the pitch diameter is not less than 13.28 mm, the minor thread diameter is not less than 12.75 mm.

11. The nut of claim 3 has a 16 mm course thread size having 2.0 mm thread pitch, the pitch diameter is not less than 15.37 mm, the minor thread diameter is not less than 14.91 mm.

12. The nut of claim 3, the thread has a minor diameter not less than 7.7% more than an industry standard basic minor diameter specified for the thread size.

13. The nut of claim 3, the thread has an asymmetric flank configuration.

14. An internally threaded, coating clearance body member for use with an associated ISO standard mating externally threaded element, comprising:
   a bore extending at least partially into the body member, the bore having a screw thread disposed therein,
   the screw thread having a pitch diameter that is at least 118 percent of a tooth height thereof,
   a minor diameter of the threaded bore that is at least 141 percent of a tooth height thereof, wherein the screw thread has a clearance of at least 170 percent when threadedly engaged with the associated ISO standard mating externally threaded element, compared to an internally threaded body having an internal thread pitch diameter ($D_2$) defined by $D_2=D-0.649(5)P$, and having a minor diameter ($D_1$) defined by $D_1=D-1.082(5)P$, where D is a nominal diameter of the internal thread, and P is the pitch of the thread.

15. A coating clearance bolt having a course thread size of 4 mm or more and a thread pitch of 0.7 or more, for use with an associated ISO standard mating internally threaded element, comprising:
   the thread disposed about a shaft of the bolt,
   the screw thread having a pitch diameter ($d_2$) that is at least 4.5 percent less than $d-0.649(5)P$, where d is a nominal diameter of the external thread and P is the pitch of the thread, wherein the screw thread has a clearance of at least 170 percent when threadedly engaged with the associated ISO standard mating internally threaded element, compared to an externally threadedly element having a pitch diameter ($d_2$) that is defined by $d-0.649(5)P$.

16. The bolt of claim 15 has a 4 mm course thread size having 0.70 mm thread pitch, the pitch diameter is not more than 3.38 mm, the major thread diameter is not more than 2.99 mm.

17. The bolt of claim 15 has a 5 mm course thread size having 0.80 mm thread pitch, the pitch diameter is not more than 4.27 mm, the major thread diameter is not more than 3.81 mm.

18. The bolt of claim 15 has a 6 mm course thread size having 1.00 mm thread pitch, the pitch diameter is not more than 5.10 mm, the major thread diameter is not more than 4.53 mm.

19. The bolt of claim 15 has a 8 mm course thread size having 1.25 mm thread pitch, the pitch diameter is not more than 6.86 mm, the major thread diameter is not more than 6.13 mm.

20. The bolt of claim 15 has a 10 mm course thread size having 1.5 mm thread pitch, the pitch diameter is not more than 8.62 mm, the major thread diameter is not more than 7.73 mm.

21. The bolt of claim 15 has a 12 mm course thread size having 1.75 mm thread pitch, the pitch diameter is not more than 10.37 mm, the major thread diameter is not more than 9.32 mm.

22. The bolt of claim 15 has a 14 mm course thread size having 2.00 mm thread pitch, the pitch diameter is not more than 12.12 mm, the major thread diameter is not more than 10.92 mm.

23. The bolt of claim 15 has a 16 mm course thread size having 2.00 mm thread pitch, the pitch diameter is not more than 14.03 mm, the major thread diameter is not more than 12.77 mm.

24. The bolt of claim 15, the screw thread has a major diameter not less than 7.7% less than an industry standard basic major diameter for the thread size.

25. The bolt of claim 15, the screw thread has an asymmetric flank configuration.

* * * * *